United States Patent
Balash (10) Patent No.: US 8,161,888 B2
(45) Date of Patent: Apr. 24, 2012

(54) CAR WASH ROLLER AND METHOD FOR MANUFACTURING THE CAR WASH ROLLER

(75) Inventor: Andrew Vaughan Balash, Harrison Township, MI (US)

(73) Assignee: Vaughan Industries Inc., Detroit, MI (US)

( * ) Notice: Subject to any disclaimer, the term of this patent is extended or adjusted under 35 U.S.C. 154(b) by 8 days.

(21) Appl. No.: 12/914,446

(22) Filed: Oct. 28, 2010

(65) Prior Publication Data
US 2011/0036263 A1  Feb. 17, 2011

Related U.S. Application Data (63) Continuation-in-part of application No. 12/077,579, filed on Mar. 20, 2008, now abandoned.

(60) Provisional application No. 60/919,764, filed on Mar. 23, 2007.

(51) Int. Cl.
*B61B 9/00* (2006.01)
(52) U.S. Cl. .............. 104/172.3; 104/172.1; 104/165
(58) Field of Classification Search ............. 104/172.1, 104/172.3, 165
See application file for complete search history.

(56) References Cited

U.S. PATENT DOCUMENTS

| | | |
|---|---|---|
| 2,511,684 A | 6/1950 | Amore |
| 2,806,236 A | 9/1957 | Stefano |
| 3,274,632 A | 9/1966 | Franklin |
| 3,305,144 A | 2/1967 | Beres et al. |
| 3,331,093 A | 7/1967 | Mayden |
| 3,381,335 A | 5/1968 | Schaedlich et al. |
| 3,596,605 A * | 8/1971 | Shelstad ............... 104/172.3 |
| 3,760,447 A | 9/1973 | Vivion |
| 3,784,063 A | 1/1974 | Otis et al. |
| 3,989,390 A | 11/1976 | Thorner |
| 4,126,401 A | 11/1978 | Stoyshin |
| 4,168,560 A | 9/1979 | Doyel |
| 4,290,442 A | 9/1981 | Shaffer |
| 4,350,299 A | 9/1982 | Stephenson et al. |
| 4,413,785 A | 11/1983 | Engelbert et al. |
| 4,552,476 A | 11/1985 | Heraty et al. |
| 4,636,102 A | 1/1987 | Drake |
| 4,715,287 A * | 12/1987 | Wentworth et al. ........ 104/172.3 |
| 4,848,384 A | 7/1989 | Christopher et al. |
| 4,848,946 A | 7/1989 | Goncalves |
| 4,864,936 A * | 9/1989 | Rietsch, Jr. ............... 104/172.1 |
| 4,873,929 A * | 10/1989 | Witecki ................ 104/172.3 |
| 4,930,424 A * | 6/1990 | Astley .................. 104/172.3 |
| 4,938,621 A | 7/1990 | Pyrozyk |
| 4,974,984 A | 12/1990 | Kafkis et al. |
| 5,184,909 A | 2/1993 | Schaefer |
| 5,547,303 A | 8/1996 | Pyrozyk |

(Continued)

*Primary Examiner* — S. Joseph Morano
*Assistant Examiner* — Jason C Smith
(74) *Attorney, Agent, or Firm* — Cantor Colburn LLP (57) ABSTRACT

A car wash roller and a manufacturing method are provided. The roller includes a body with first and second apertures and a shaft disposed in the first aperture. The body further includes a third aperture extending from a top surface to the first aperture. The shaft has an aperture that is aligned with the third aperture. The roller further includes a locking member disposed in both the third aperture and the aperture of the shaft that prevents the shaft from rotating relative to the body. The roller further includes first and second plastic sleeves that are disposed on the shaft, such that the sleeves do not rotate relative to the shaft. The roller further includes first and second plastic wheels that are rotatably coupled to the first and second plastic sleeves, respectively.

13 Claims, 12 Drawing Sheets

U.S. PATENT DOCUMENTS

| | | |
|---|---|---|
| 5,567,073 A | 10/1996 | de Laforcade et al. |
| 5,641,233 A | 6/1997 | Wilson |
| 5,977,050 A | 11/1999 | Faris |
| 6,048,583 A | 4/2000 | Waddell |
| 6,186,073 B1 * | 2/2001 | Reitsch, Jr. ................ 104/172.1 |
| 6,647,894 B1 * | 11/2003 | Simoes ...................... 104/172.1 |
| 6,668,731 B2 * | 12/2003 | Calisi et al. ................ 104/172.3 |
| 7,530,317 B1 * | 5/2009 | Belanger et al. ........... 104/172.3 |
| 2002/0066389 A1 * | 6/2002 | Rietsch, Jr. ................ 104/172.3 |
| 2003/0200892 A1 * | 10/2003 | Calisi et al. ................ 104/172.3 |
| 2004/0221878 A1 * | 11/2004 | Johnson ...................... 134/56 R |
| 2006/0191773 A1 * | 8/2006 | Horn ............................ 198/817 |
| 2006/0225601 A1 * | 10/2006 | Belanger et al. ............... 104/165 |
| 2007/0284223 A1 * | 12/2007 | Belanger et al. ............... 198/618 |
| 2008/0229965 A1 * | 9/2008 | Balash .......................... 104/162 |

* cited by examiner

CAR WASH ROLLER AND METHOD FOR MANUFACTURING THE CAR WASH ROLLER

CROSS REFERENCE TO RELATED CASES

The present application is a continuation-in-part of U.S. patent application, Ser. No. 12,077,579 filed on Mar. 20, 2008, the contents of which are incorporated herein by reference thereto in its entirety. U.S. patent application Ser. No. 12,077,579 claims the benefit of U.S. Provisional Application No. 60/919,764, filed on Mar. 23, 2007, the contents of which are incorporated by reference herein in its entirety.

BACKGROUND

Car wash rollers have been utilized in car wash conveyor systems. Generally, car wash rollers having a body, wheels, and shafts are constructed entirely out of metal. Thus, the car wash rollers are relatively heavy and are relatively hard to manufacture. Also, the metal-on-metal rotational contact between the wheels and shafts of the car wash rollers reduces the durability and operational life of the car wash rollers and result in relatively noisy operation.

Accordingly, the inventor herein has recognized a need for an improved car wash roller and method of manufacturing the car wash roller that minimizes and/or eliminates the above-identified deficiencies.

SUMMARY

A car wash roller in accordance with an exemplary embodiment is provided. The car wash roller includes an elongated plastic body having a first side surface, a second side surface disposed opposite the first side surface, a top surface, a bottom surface disposed opposite the top surface, and first and second apertures extending therethrough from the first side surface to the second side surface. The car wash roller further includes a first metal shaft disposed in the first aperture such that a first portion of the first metal shaft extends outwardly from the first side surface and a second portion of the first metal shaft extends outwardly from the second side surface. The elongated plastic body further includes a third aperture extending from the top surface to the first aperture. The first metal shaft has an aperture extending therein that is aligned with the third aperture. The car wash roller further includes a locking member disposed in both the third aperture of the elongated plastic body and the aperture of the first metal shaft that prevents the first metal shaft from rotating relative to the elongated plastic body. The car wash roller further includes first and second plastic sleeves that are disposed over the first and second portions, respectively, of the first metal shaft, such that the first and second plastic sleeves do not rotate relative to the first metal shaft. The car wash roller further includes first and second plastic wheels that are rotatably coupled to the first and second plastic sleeves, respectively. The car wash roller further includes a second metal shaft disposed in the second aperture such that a first portion of the second metal shaft extends outwardly from the first side surface and a second portion of the second metal shaft extends outwardly from the second side surface. The car wash roller further includes third and fourth plastic wheels that are rotatably coupled to the first portion of the second metal shaft and the second portion of the second metal shaft, respectively. The car wash roller further includes a carrier link coupled to the elongated plastic body proximate to the third and fourth plastic wheels.

A method for manufacturing a car wash roller in accordance with another exemplary embodiment is provided. The method includes cutting a plastic component to form an elongated plastic body having a first side surface, a second side surface disposed opposite the first side surface, a top surface, and a bottom surface disposed opposite the top surface, utilizing a milling machine. The method further includes drilling first and second apertures through the elongated plastic body that extends from the first side surface to the second side surface. The method further includes disposing a first metal shaft through the first aperture such that a first portion of the first metal shaft extends outwardly from the first side surface and a second portion of the first metal shaft extends outwardly from the second side surface. The method further includes drilling a third aperture through the elongated plastic body extending from the top surface to the bottom surface. The method further includes drilling an aperture through the first metal shaft. The method further includes disposing a locking member in both the third aperture of the elongated plastic body and the aperture of the first metal shaft that prevents the first metal shaft from rotating relative to the elongated plastic body. The method further includes disposing first and second plastic sleeves over the first and second portions, respectively, of the first metal shaft, utilizing a placement machine such that the first and second plastic sleeves do not rotate relative to the first metal shaft. The method further includes rotatably coupling first and second plastic wheels to the first and second plastic sleeves, respectively. The method further includes disposing a second metal shaft through the second aperture such that a first portion of the second metal shaft extends outwardly from the first side surface and a second portion of the second metal shaft extends outwardly from the second side surface. The method further includes rotatably coupling third and fourth plastic wheels to the first portion of the second metal shaft and the second portion of the second metal shaft, respectively.

DESCRIPTION OF EXEMPLARY EMBODIMENTS

Referring to FIGS. 1-8, a car wash roller 10 that is configured to hold a vehicle wheel thereon for moving the vehicle in a car wash conveyor system in accordance with an exemplary embodiment is illustrated. The car wash roller 10 includes an elongated plastic body 20, metal shafts 22, 24, plastic sleeves 26, 28, a locking member 30, plastic wheels 40, 42, 44, 46, 48, 50, a carrier link 60, and four bolts 62 one of which is shown. An advantage of the car wash roller 10 is that the roller 10 is less than 10 pounds in weight which decreases an amount of energy required to move the roller 10 in the car wash conveyor system. Also, the car wash roller 10 utilizes plastic sleeves that the plastic wheels 40, 42, 44, 46 rotate on which increases an operational life of the plastic wheels and reduces operational noise of the car wash roller 10.

Referring to FIGS. 2-6, the elongated plastic body 20 is configured to support the other components of the car wash roller 10. The elongated plastic body 20 includes side surfaces 70, 72 disposed opposite one another, a top surface 74, a bottom surface disposed opposite the top surface 74. The body 20 further includes apertures 80, 82 extending from the side surface 70 to the side surface 72. The body 20 further includes an aperture 84 extending from the top surface 74 to the aperture 80. In one exemplary embodiment, the body 20 is constructed of ultra high molecular weight (UHMW) plastic. Of course, in alternative embodiments, the body 20 could be constructed of other types of plastics known to those skilled in the art such as polypropylene, PVC, urethane, nylon, acetal, or polytetrafloraeythelyne for example. In one exemplary embodiment, a distance between the side surfaces 70, 72 is 1.0-1.75 inches. Also, a distance between the top surface 74 and the bottom surface 76 is 1.0-3.0 inches.

Figure 2:
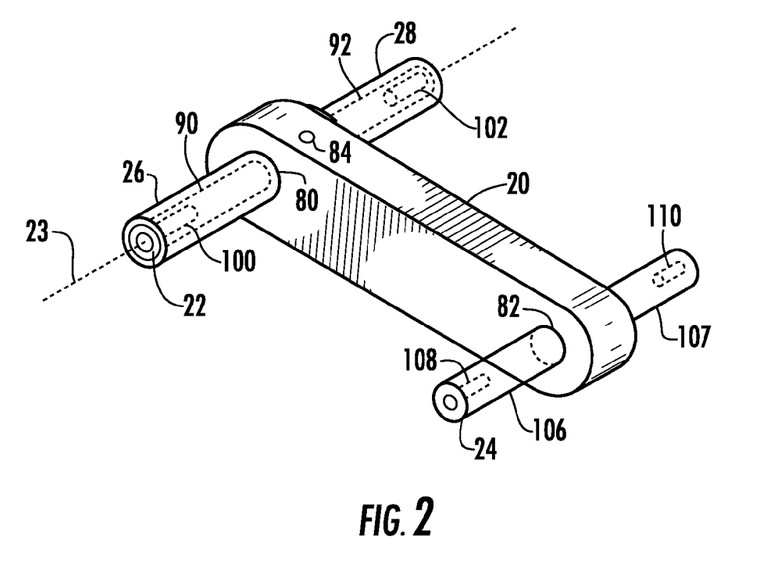
FIG. 2 is a schematic of an elongated plastic body and metal shafts utilized in the car wash roller of FIG. 1.
Figure 3:
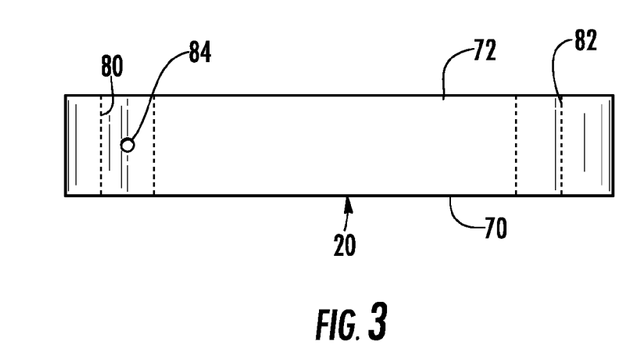
FIG. 3 is a top view of the elongated plastic body of FIG. 2.
Figure 4:
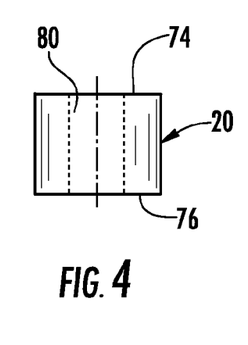
FIG. 4 is an end view of the elongated plastic body of FIG. 2.
Figure 5:
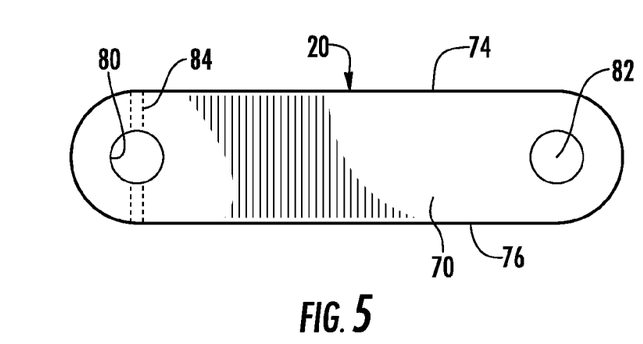
FIG. 5 is a side view of the elongated plastic body of FIG. 2.
Figure 6:
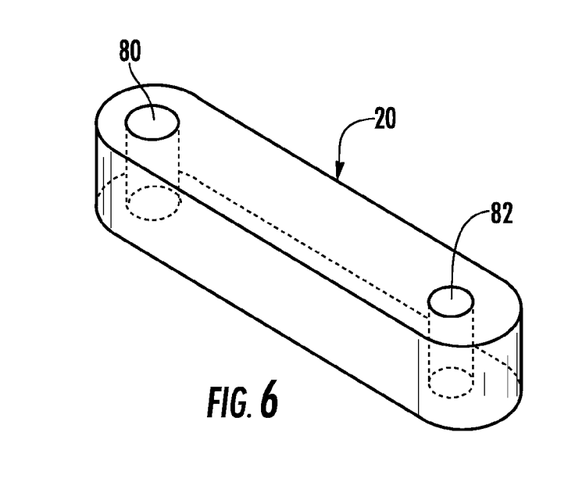
FIG. 6 is an isometric view of the elongated plastic body of FIG. 2.
Figure 7:
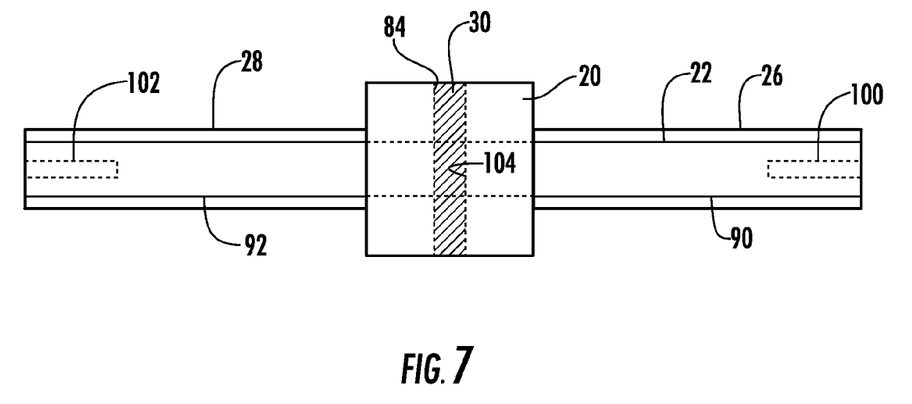
FIG. 7 is a cross-sectional schematic of a portion of the elongated plastic body of FIG. 2.

Referring to FIGS. 2, 3, and 7, the metal shaft 22 is disposed in the aperture 80 and has portions 90, 92. The portion 90 extends outwardly from the side surface 70, and the portion 92 extends outwardly from the side surface 72. The metal shaft 22 includes threaded apertures 100, 102 extending inwardly from first and second ends, respectively, of the shaft 22. The metal shaft 22 further includes an aperture 104 that is aligned with the aperture 84 in the elongated plastic body 20. In one exemplary embodiment, the metal shaft 22 is constructed of steel. Of course, in alternative embodiments, the metal shaft 22 could be constructed of other types of metals known to those skilled in the art.

The locking member 30 is disposed in both the aperture 104 and the aperture 84 to prevent the metal shaft 22 from rotating relative to the elongated plastic body 20. In one exemplary embodiment, the locking member 30 is a steel pin such as a roll pin. Of course, in alternative embodiments, the locking member could be other locking devices known to those skilled in the art such as set screws or bolts for example.

The plastic sleeves 26, 28 are configured to be disposed over the portions 90, 92, respectively, of the metal shaft 22. The plastic sleeves 26, 28 are tubular-shaped. In one exemplary embodiment, the plastic sleeves 26, 28 are constructed of UHMW plastic. Of course, in alternative embodiments, the plastic sleeves 26, 28 could be constructed of other types of plastics known to those skilled in the art, such as polypropylene, PVC, urethane, nylon, acetal, or polytetrafloraeythelyne for example.

Referring to FIGS. 2 and 3, the metal shaft 24 is disposed in the aperture 82 and has portions 106, 107. The portion 106 extends outwardly from the side surface 70, and the portion 107 extends outwardly from the side surface 72. The metal shaft 24 includes threaded apertures 108, 110 extending inwardly from first and second ends, respectively, of the shaft 24. In one exemplary embodiment, the metal shaft 24 is constructed of steel. Of course, in alternative embodiments, the metal shaft 24 could be constructed of other types of metals known to those skilled in the art. In another exemplary embodiment, the metal shaft 24 could be replaced with a bolt and a nut threadably coupled to an end of the bolt.

Figure 1:
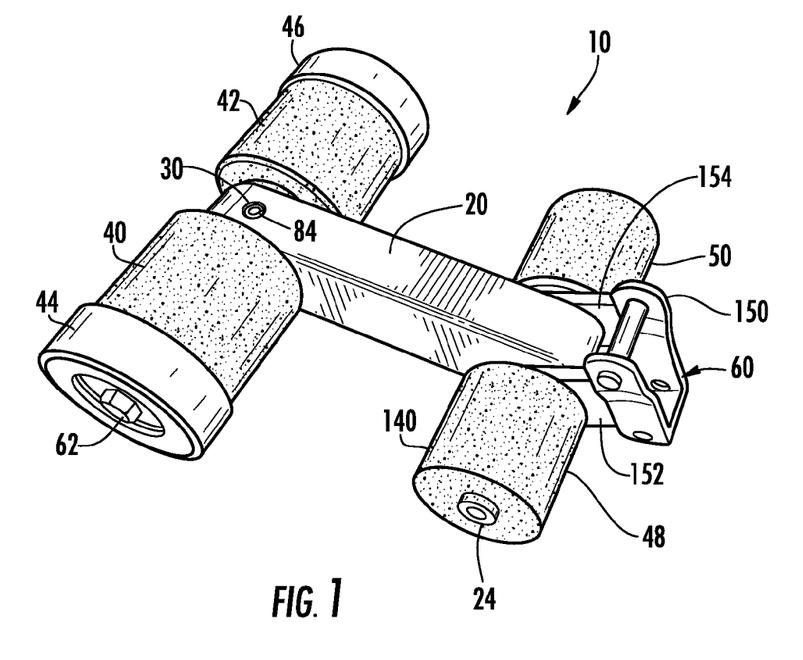
FIG. 1 is a schematic of a car wash roller in accordance with an exemplary embodiment.
Figure 8:
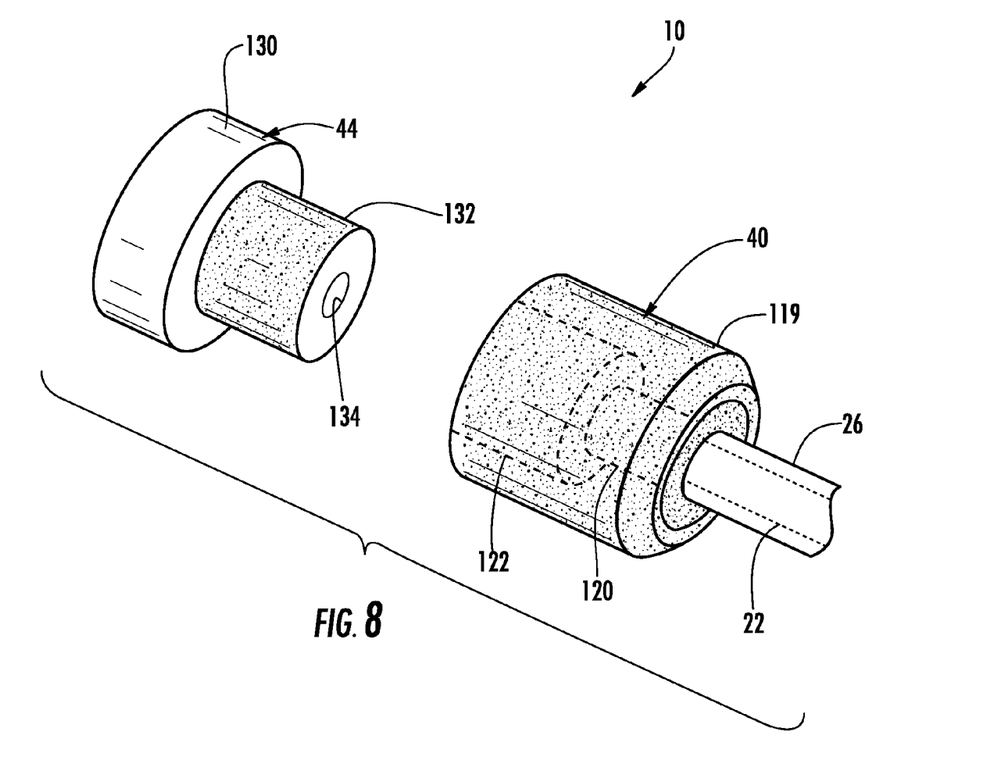
FIG. 8 is a schematic of plastic wheels utilized in the car wash roller of FIG. 1.

Referring to FIGS. 1, 2 and 8, the plastic wheels 40, 42, also known as inboard wheels, are configured to be rotatably coupled to the plastic sleeves 26, 28, respectively, disposed on the metal shaft 22. Since the plastic wheels 40, 42 have an identical structure, only the plastic wheel 40 will be discussed in greater detail hereinafter. The plastic wheel 40 includes a cylindrical body 119 with an aperture 120 extending inwardly from a first end therein that is configured to receive the plastic sleeve 26 therethrough. The plastic wheel 40 further includes another aperture 122 extending inwardly from a second end therein that communicates with the aperture 122. The aperture 122 is configured to receive a sleeve portion 132 of the plastic wheel 44 therein. In one exemplary embodiment, the plastic wheels 40, 42 are constructed of UHMW plastic. Of course, in alternative embodiments, the plastic wheels 40, 42 could be constructed of other types of plastics known to those skilled in the art such as polypropylene, PVC, urethane, nylon, acetal, or polytetrafloraeythelyne for example.

The plastic wheels 44, 46, also known as outboard wheels, are configured to be rotatably coupled to the plastic sleeves 26, 28, respectively, adjacent to the plastic wheels 40, 42, respectively. Since the plastic wheels 44, 46 have an identical structure, only the plastic wheel 44 will be discussed in greater detail hereinafter. The plastic wheel 44 includes a cylindrical body 130 and a sleeve portion 132 coupled to the cylindrical body 130. An aperture 134 extends through the plastic wheel 44 to receive the plastic sleeve 26 therethrough. As discussed above, the sleeve portion 132 is disposed in the aperture 122 of the plastic wheel 40 such that the plastic wheel 44 and the plastic wheel 40 can rotate independently with respect to each other on the plastic sleeve 26. An advantage of utilizing the plastic sleeve 26 with the plastic wheels 40, 44 is that having plastic-on-plastic contact allows for a greater operational life of both the plastic sleeve and the plastic wheels 40, 44 as compared to utilizing a differing types of materials such as a metal contacting the plastic wheels 40, 44. In one exemplary embodiment, the plastic wheels 44, 46 are constructed of UHMW plastic. Of course, in alternative embodiments, the plastic wheels 44, 46 could be constructed of other types of plastics known to those skilled in the art such as polypropylene, PVC, urethane, nylon, acetal, or polytetrafloraeythelyne for example.

The metal shaft 22, the plastic sleeves 26, 28, and the plastic wheels 40, 42, 44, 46 are centered about an axis 23. Accordingly, the wheels 40, 42, 44, 46 rotate about the axis 23.

Referring to FIGS. 1 and 2, the bolt 62 is disposed in the threaded aperture 100 of the metal shaft 22 to hold the wheels 40, 44 on the metal shaft 22. Another bolt is disposed in the threaded aperture 108 to hold the plastic wheel 48 on the metal shaft 24. A bolt is also disposed in the threaded aperture 102 to hold the plastic wheels 42, 46 on the metal shaft 24. Also, a bolt is disposed in the threaded aperture 110 of the metal shaft 24 to hold the plastic wheel 50 on the metal shaft 24.

The plastic wheels 48, 50 are configured to be rotatably coupled to the portions 106, 107, respectively, of the metal shaft 24. Since the plastic wheels 48, 50 have an identical structure, only the plastic wheel 48 will be discussed in greater detail hereinafter. The plastic wheel 48 includes a cylindrical body 140 with an aperture extending therethrough configured to receive the metal shaft 24 therethrough. In one exemplary embodiment, the plastic wheels 48, 50 are constructed of UHMW plastic. Of course, in alternative embodiments, the plastic wheels 48, 50 could be constructed of other types of plastics known to those skilled in the art such as polypropylene, PVC, urethane, nylon, acetal, or polytetraflo-raeythelyne for example.

Referring to FIG. 1, the carrier link 60 is configured to be coupled to the metal shaft 24. The carrier link 60 includes a U-shaped bracket 150 and arm portions 152, 154 extending outwardly from the U-shaped bracket 150. Each of the arm portions 152, 154 have an aperture extending therethrough configured to receive the metal shaft 24 therethrough. Thus, the carrier link 60 can rotate about the metal shaft 24. The carrier link 60 is coupled to a car wash conveyor system that pulls the carrier link 60 and the car wash roller 10. In one exemplary embodiment, the carrier link 60 is constructed of steel. Of course, in alternative embodiments, the carrier link 60 can be constructed of other types of materials known to those skilled in the art.

Figure 9:
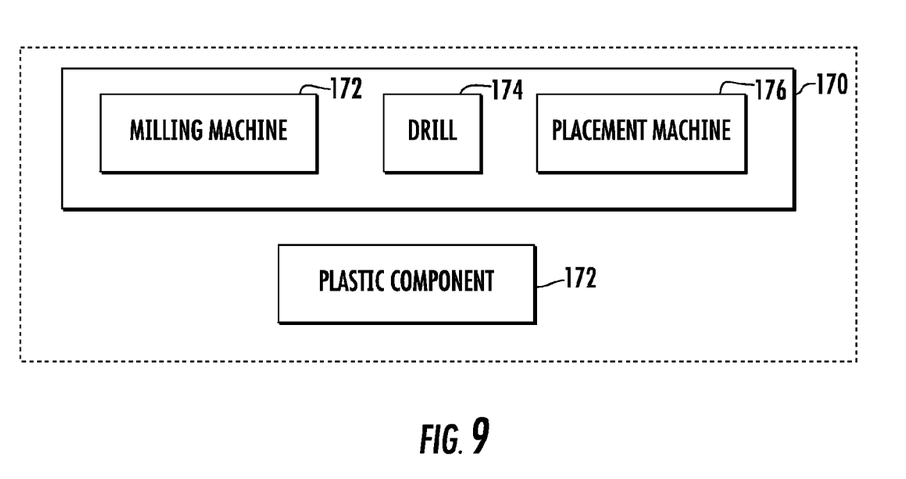
FIG. 9 is a schematic of a system for manufacturing the car wash roller of FIG. 1.

Referring to FIG. 9, a system 170 utilized to construct the car wash roller 10 is illustrated. The system 170 includes a milling machine 172, a drill 174, and a placement machine 176. As will be discussed, below, the system 170 can machine a plastic component or block 172 to form the elongated plastic body 20.

Referring to FIGS. 2, 3, 7, 10 and 11, flowcharts of a method for manufacturing a car wash roller in accordance with another exemplary embodiment will now be explained.

Figure 10:
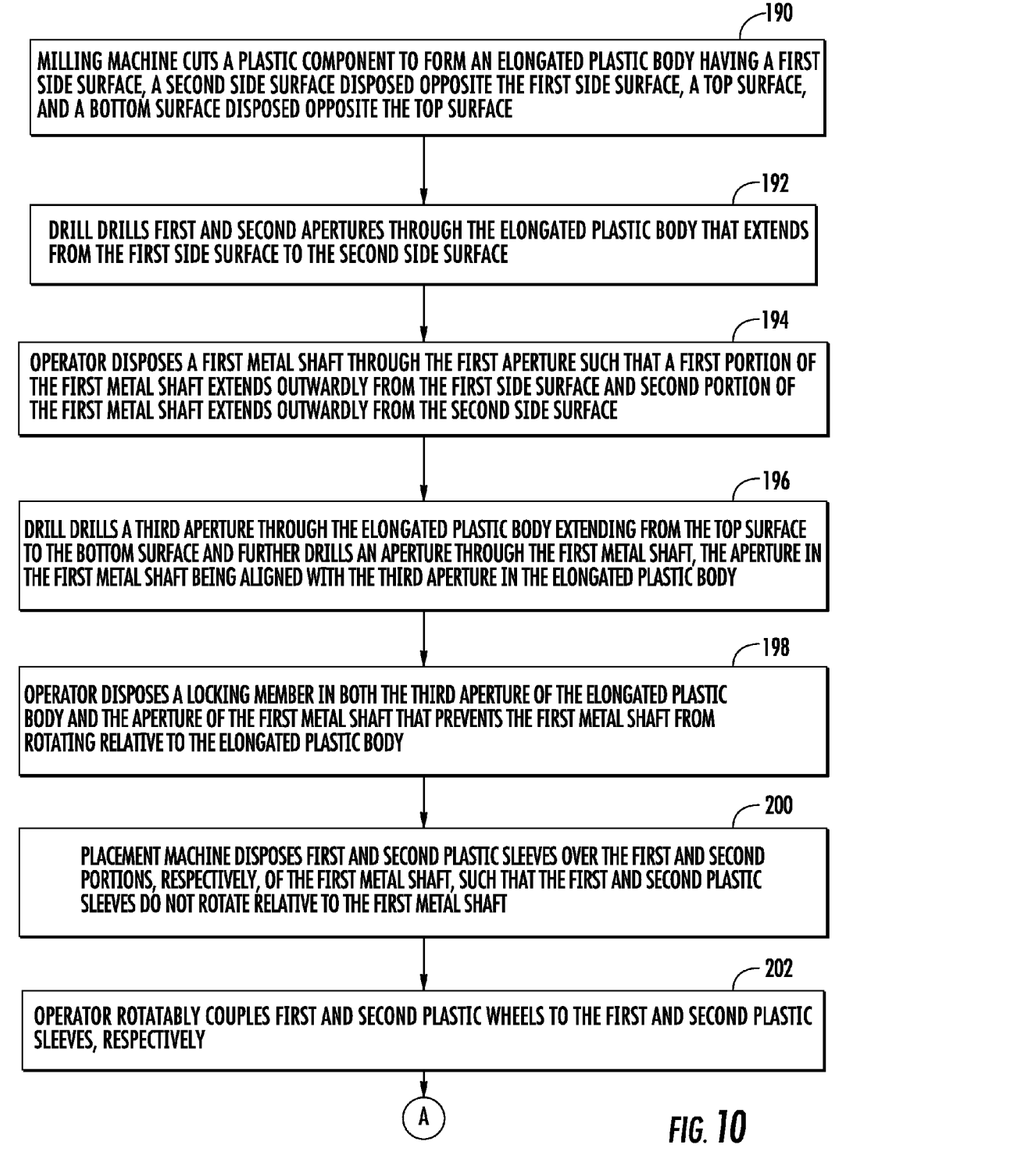
FIGS. 10 and 11 are flowcharts of a method for manufacturing a car wash roller in accordance with another exemplary embodiment.

At step 190, the milling machine 172 cuts the plastic component 172 to form the elongated plastic body 20 having the side surface 70, the side surface 72 disposed opposite the side surface 70, the top surface 74, and the bottom surface 76 disposed opposite the top surface 74.

At step 192, the drill 174 drills apertures 80, 82 through the elongated plastic body 20 that extends from the side surface 70 to the side surface 72. In an alternative method, the milling machine 172 could form the apertures 80, 82 through the elongated plastic body 20, instead of the drill 174.

At step 194, an operator disposes the metal shaft 22 through the aperture 80 such that the portion 90 of the metal shaft 22 extends outwardly from the side surface 70, and the portion 92 of the metal shaft 22 extends outwardly from the side surface 72.

At step 196, the drill 174 drills the aperture 84 into the elongated plastic body 20 extending from the top surface 74 to the aperture 80 and further drills an aperture 104 into the metal shaft 22. The aperture 104 in the metal shaft 22 is aligned with the aperture 84 in the elongated plastic body 20. In an alternative method, the milling machine 172 could form the aperture 84 in the elongated plastic body 20, instead of the drill 174.

At step 198, the operator disposes the locking member 30 in both the aperture 84 of the elongated plastic body 20 and the aperture 104 of the metal shaft 22 that prevents the metal shaft 22 from rotating relative to the elongated plastic body 20 and prevents the metal shaft 22 from moving axially relative to the elongated plastic body 20.

At step 200, the placement machine 176 disposed the plastic sleeves 26, 28 over the portions 90, 92, respectively, of the metal shaft 26, such that the plastic sleeves 26, 28 do not rotate relative to the metal shaft 26.

Figure 11:
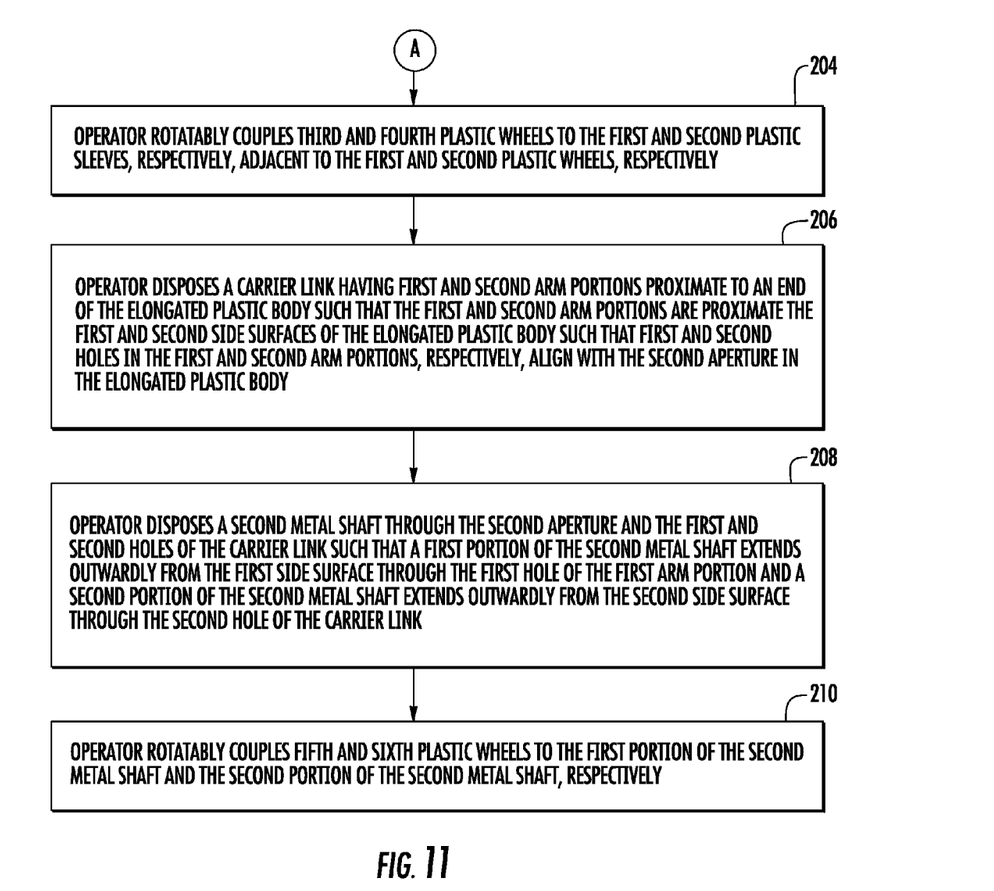

At step 202, the operator rotatably couples the plastic wheels 40, 42, also known as the inboard wheels, to the plastic sleeves 26, 28, respectively.

At step 204, the operator rotatably couples plastic wheels 44, 46, also known as the outboard wheels, to the plastic sleeves 26, 28, respectively, adjacent to the plastic wheels 26, 28, respectively. The bolts 62 are also disposed in the threaded apertures 100, 102 of the metal shaft 22 to hold the plastic wheels 40, 42, 44 and 46 on the metal shaft 22.

At step 206, the operator disposes the carrier link 60 having the arm portions 152, 154 proximate to an end of the elongated plastic body 20 such that the arm portions 152, 154 are proximate the side surfaces 70, 72 of the elongated plastic body 20 and first and second holes in the arm portions 152, 154, respectively, align with the aperture 82 in the elongated plastic body 20.

At step 208, the operator disposes the metal shaft 24 through the aperture 82 and the first and second holes of the carrier link 60 such that the portion 106 of the metal shaft 24 extends outwardly from the side surface 70 through the first hole of the arm portion 152 and the portion 107 of the metal shaft 24 extends outwardly from the side surface 72 through the second hole of the carrier link 60.

At step 210, the operator rotatably couples the plastic wheels 48, 50 to the portions 106, 107, respectively, of the metal shaft 24.

Figure 12:
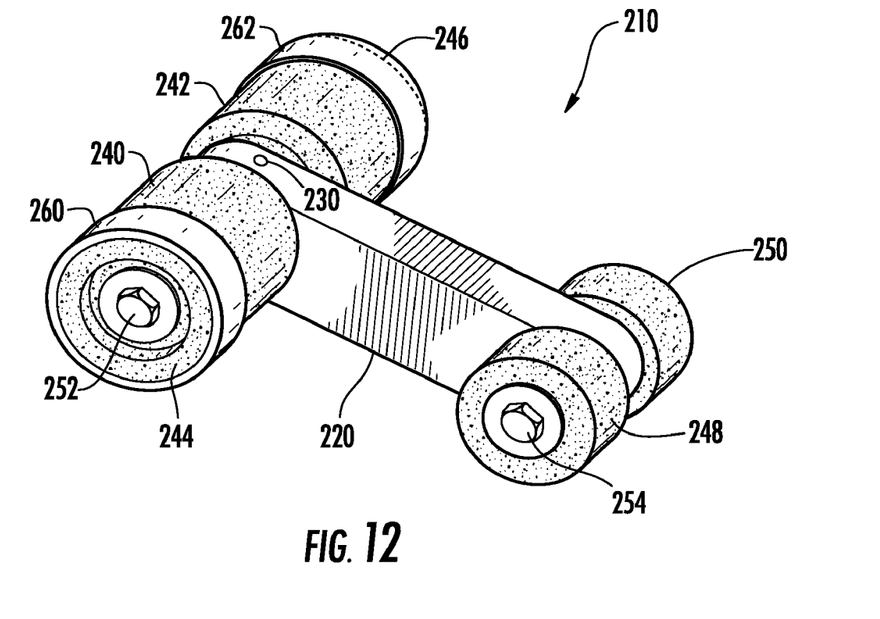
FIG. 12 is a schematic of another car wash roller in accordance with another exemplary embodiment.
Figure 13:
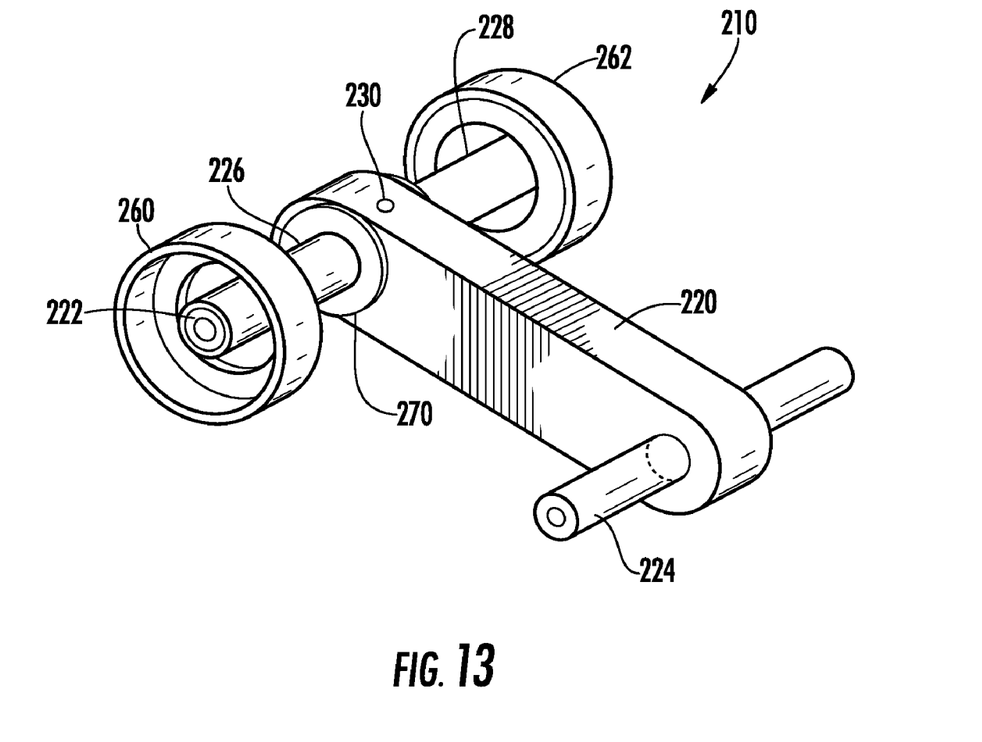
FIG. 13 is a schematic of a portion of the car wash roller of FIG. 12.

Referring to FIGS. 12 and 13, another car wash roller 210 in accordance with another exemplary embodiment is illustrated. The car wash roller 210 includes an elongated plastic body 220, metal shafts 222, 224, plastic sleeves 226, 228, a locking member 230, plastic wheels 240, 242, 244, 246, 248, 250, bolts 252, 254, metal sleeves 260, 262, and a spacer portion 270. The structure of the car wash roller 210 is similar to the structure of the car wash roller 10 except that the car wash roller 210 utilizes the metal sleeves 260, 262 disposed on the plastic wheels 244, 246, and the elongated plastic body 220 has a spacer portion 270 on each side surface of the plastic body 220. Also, the car wash roller 210 can also have a carrier link 60 coupled thereto, similar as car wash roller 10. In an alternative embodiment, the metal shaft 224 could be replaced with a bolt and a nut threadably coupled to an end of the bolt.

Figure 14:
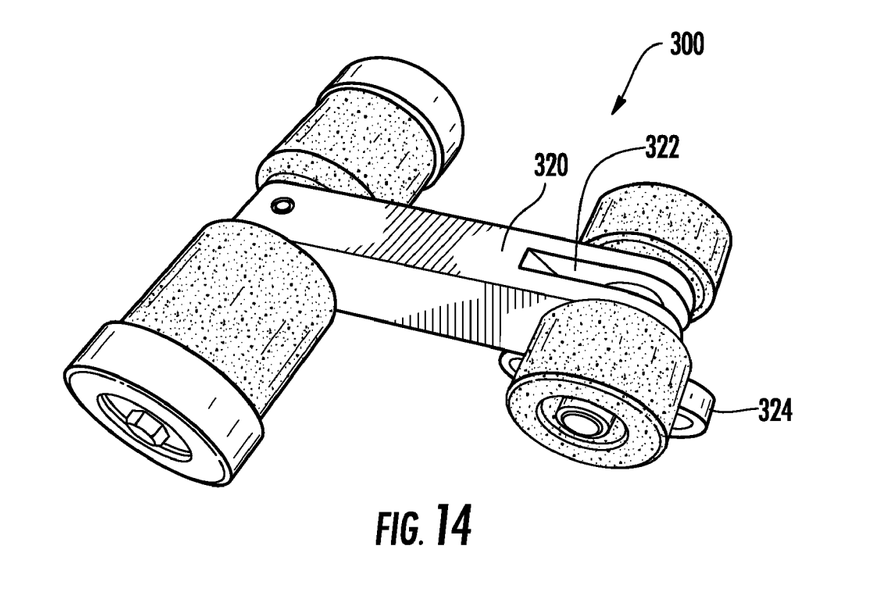
FIG. 14 is a schematic of another car wash roller in accordance with another exemplary embodiment.

Referring to FIG. 14, another car wash roller 300 in accordance with another exemplary embodiment is illustrated. The car wash roller 300 has a similar structure than the car wash roller 210 except that the car wash roller 300 has an elongated plastic body 320 with a slot 322. The slot 322 is configured to receive a carrier link 324 therein that is coupled to a front metal shaft of the roller 300.

Referring to FIGS. 15-22, a car wash roller 350 in accordance with another exemplary embodiment is illustrated. The car wash roller 350 includes an elongated plastic body 420, metal shafts 422, 424, plastic sleeves 426, 428, a locking member 430, plastic wheels 440, 442, 444, 446, 448, 450, a carrier link 460, and bolts 462, 464.

Referring to FIGS. 16-20, the elongated plastic body 420 is configured to support the other components of the car wash roller 350. The elongated plastic body 420 includes side surfaces 470, 472 disposed opposite one another, a top surface 474, and a bottom surface 476 disposed opposite the top surface 474. The side surface 470 defines spacer portions 490, 494, and the side surface 472 defines spacer portions 492, 496. The body 420 further includes apertures 510, 512 extending from the side surface 470 to the side surface 472. The body 420 further includes an aperture 514 extending from the top surface 474 to the aperture 510. Also, the body 420 has a slot 520 extending inwardly from an end of the body 420. The slot 520 defines internal angled surfaces 522, 524 that form a vertex 526 proximate to the aperture 512. The slot 520 is configured to allow a portion of the carrier link 460 to be disposed therein. During operation, the surfaces 522, 524 act as stopping surfaces for the carrier link 460 such that a conveyor chain coupled to the carrier link 460 does not contact the body 420. In one exemplary embodiment, a thickness D of each front portion of the body 420 has a thickness of 0.75 inches to ensure that the body 420 does not axially deform or break during operation. In one exemplary embodiment, the body 420 is constructed of UMHW plastic. Of course, in alternative embodiments, the body 420 could be constructed of other types of plastics known to those skilled in the art such as polypropylene, PVC, urethane, nylon, acetal, or polytetrafloraeythelyne for example. In one exemplary embodiment, a distance between the side surfaces 470, 472 is 1.0-1.75 inches. Also, a distance between the top surface 474 and the bottom surface 476 is 1.0-3.0 inches.

Figure 16:
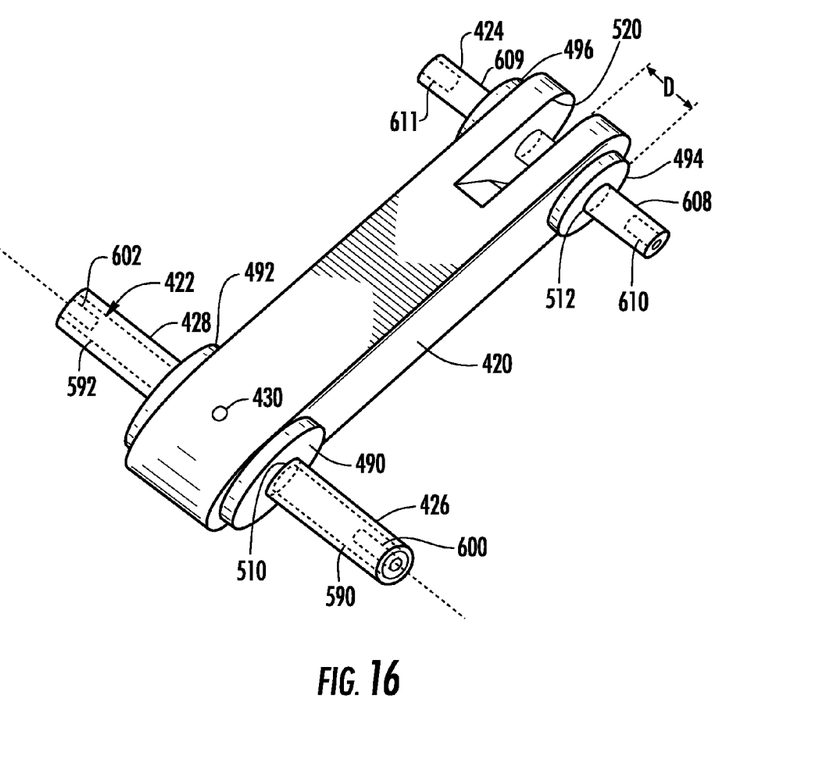
FIG. 16 is a schematic of an elongated plastic body and metal shafts utilized in the car wash roller of FIG. 15.
Figure 17:
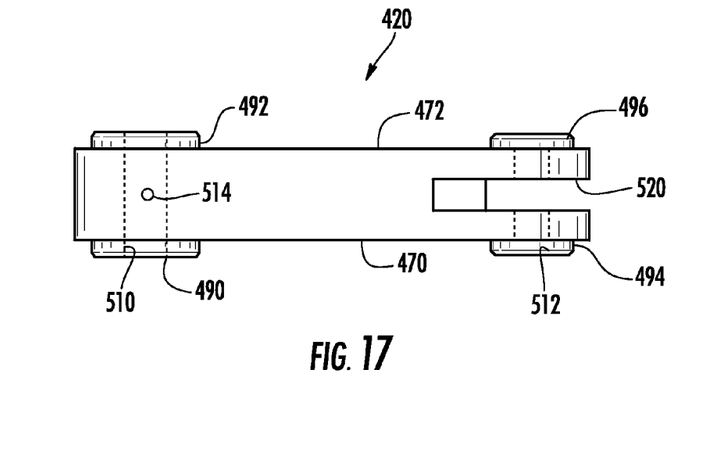
FIG. 17 is a top view of the elongated plastic body of FIG. 16.
Figure 18:
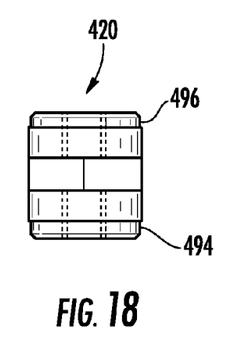
FIG. 18 is an end view of the elongated plastic body of FIG. 16.
Figure 19:
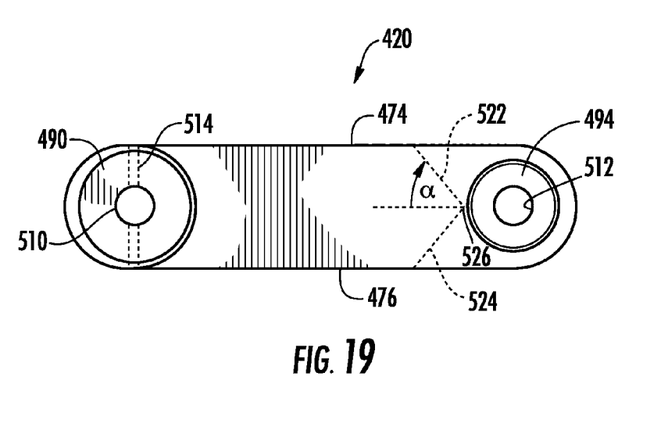
FIG. 19 is a side view of the elongated plastic body of FIG. 16.
Figure 20:
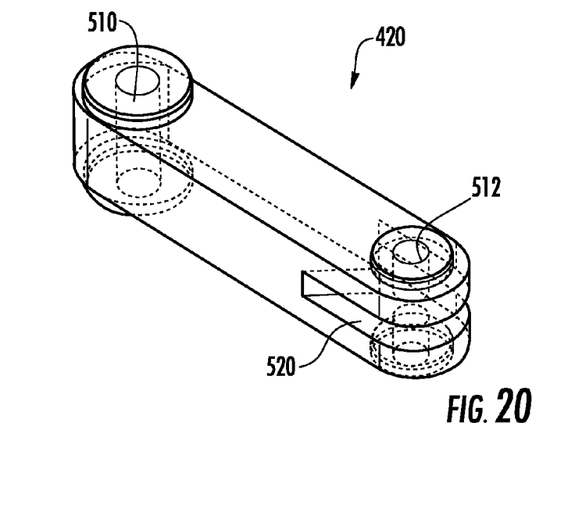
FIG. 20 is an isometric view of the elongated plastic body of FIG. 16.
Figure 21:
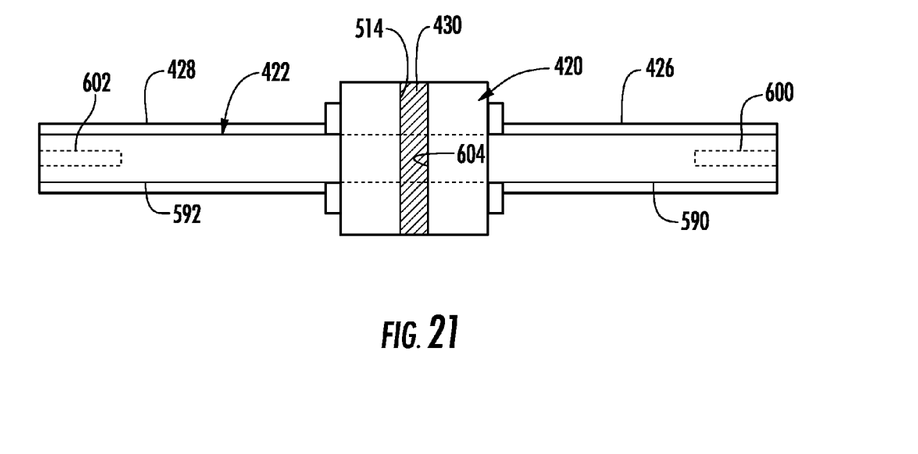
FIG. 21 is a cross-sectional schematic of a portion of the elongated plastic body of FIG. 16.

Referring to FIGS. 16 and 21, the metal shaft 422 is disposed in the aperture 510 and has portions 590, 592. The portion 590 extends outwardly from the side surface 470, and a portion 592 extends outwardly from the side surface 472. The metal shaft 422 has threaded apertures 600, 602 extending inwardly from first and second ends, respectively, of the shaft 422. The metal shaft 422 further includes an aperture 604 that is aligned with the aperture 514 in the elongated plastic body 420. In one exemplary embodiment, the metal shaft 422 is constructed of steel. Of course, in alternative embodiments, the metal shaft 422 could be constructed of other types of metals known to those skilled in the art.

Referring to FIG. 21, the locking member 430 is disposed in both the aperture 514 and the aperture 604 to prevent the metal shaft 422 from rotating relative to the elongated plastic body 420. In one exemplary embodiment, the locking member 430 is a steel pin such as a roll pin. Of course, in alternative embodiments, the locking member 430 could be other locking devices known to those skilled in the art such as set screws or bolts for example.

The plastic sleeves 426, 428 are configured to be disposed over the portions 490, 492, respectively, of the metal shaft 422. In one exemplary embodiment, the plastic sleeves 426, 428 are disposed over the portions 490, 492, respectively, of the metal shaft 422. The plastic sleeves 426, 428 are tubular-shaped. In one exemplary embodiment, the plastic sleeves 426, 428 are constructed of UHMW. Of course, in alternative embodiments, the plastic sleeves 426, 428 could be constructed of other types of plastics known to those skilled in the art such as polypropylene, PVC, urethane, nylon, acetal, or polytetrafloraeythelyne for example.

Referring to FIG. 16, the metal shaft 424 is disposed in the aperture 512 and has portions 608, 609. The portion 608 extends outwardly from the side surface 470, and the portion 609 extends outwardly from the side surface 472. The metal shaft 424 includes threaded apertures 610, 611 extending inwardly from first and second ends, respectively, of the shaft 424. In one exemplary embodiment, the metal shaft 424 is constructed of steel. Of course, in alternative embodiments, the metal shaft 424 could be constructed of other types of metals known to those skilled in the art.

Figure 15:
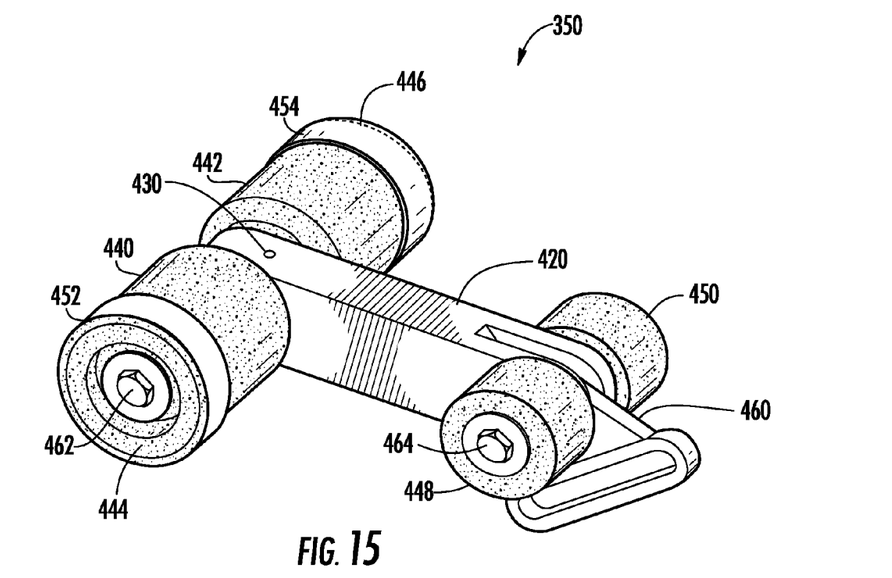
FIG. 15 is a schematic of another car wash roller in accordance with another exemplary embodiment.
Figure 22:
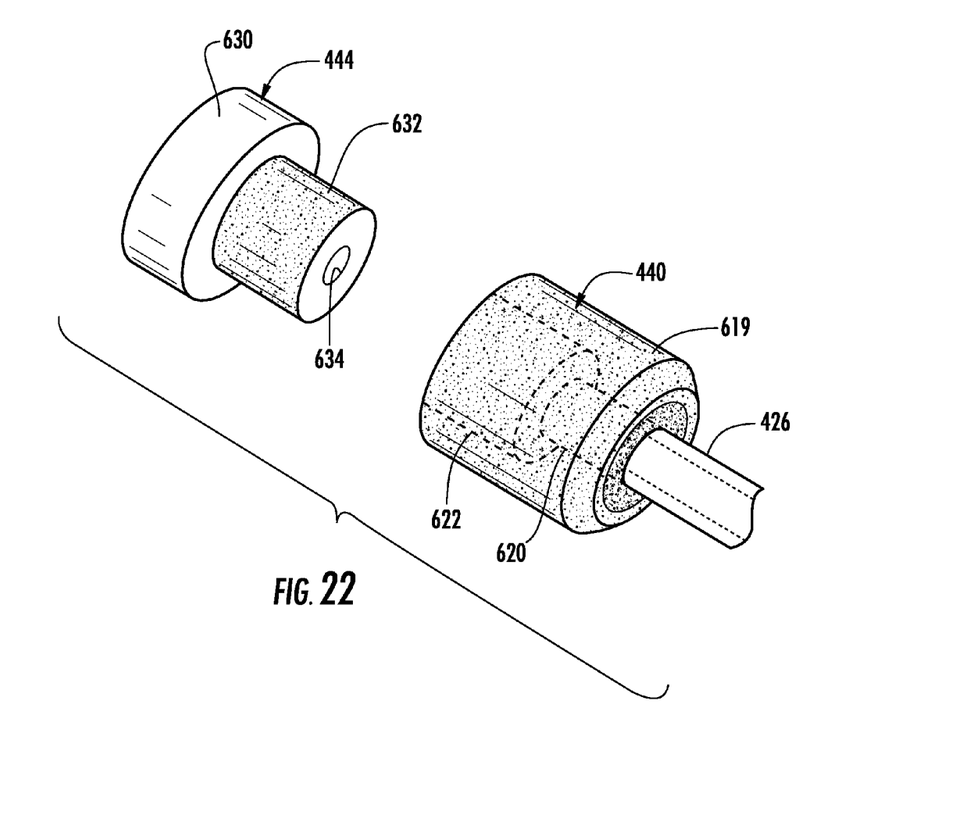
FIG. 22 is a schematic of plastic wheels utilized in the car wash roller of FIG. 15.

Referring to FIGS. 15 and 22, the plastic wheels 440, 442, also known as inboard wheels, are configured to be rotatably coupled to the plastic sleeves 426, 428, respectively, disposed on the metal shaft 422. Since the plastic wheels 440, 442 have an identical structure, only the plastic wheel 440 will be discussed in greater detail hereinafter. The plastic wheel 440 includes a cylindrical body 619 with an aperture 620 extending inwardly from a first end therein that is configured to receive the plastic sleeve 426 therethrough. The plastic wheel 440 further includes another aperture 622 extending inwardly from a second end therein that communicates with the aperture 620. The aperture 622 is configured to receive a sleeve portion 632 of the plastic wheel 444 therein. In one exemplary embodiment, the plastic wheels 440, 442 are constructed of UHMW plastic. Of course, in alternative embodiments, the plastic wheels 440, 442 could be constructed of other types of plastics known to those skilled in the art such as polypropylene, PVC, urethane, nylon, acetal, or polytetrafloraeythelyne for example.

The plastic wheels 444, 446, also known as outboard wheels, are configured to be rotatably coupled to the plastic sleeves 426, 428, respectively, adjacent to the plastic wheels 440, 442, respectively. Since the plastic wheels 444, 446 have an identical structure, only the plastic wheel 444 will be discussed in greater detail hereinafter. The plastic wheel 444 includes a cylindrical body 630 and a sleeve portion 632 coupled to the cylindrical body 630. An aperture 634 extends through the plastic wheel 444 to receive the plastic sleeve 426 therethrough. As discussed above, the sleeve portion 632 is disposed in the aperture 622 of the plastic wheel 440 such that the plastic wheel 444 and the plastic wheel 440 can rotate independently with respect to each other on the plastic sleeve 426. An advantage of utilizing the plastic sleeve 426 with the plastic wheels 440, 444 is that having plastic-on-plastic contact allows for a greater operational life of both the plastic sleeve 426 and the plastic wheels 440, 444 as compared to utilizing differing types of materials such as a metal shaft contacting the plastic wheels 440, 444. In one exemplary embodiment, the plastic wheels 444, 446 are constructed of UHMW plastic. Of course, in alternative embodiments, the plastic wheels 444, 446 could be constructed of other types of plastics known to those skilled in the art such as polypropylene, PVC, urethane, nylon, acetal, or polytetrafloraeythelyne for example.

Referring to FIGS. 15 and 16, the plastic wheels 448, 450 are configured to be rotatably coupled to the portions 608, 609, respectively, of the metal shaft 424. Since the plastic wheels 448, 450 have an identical structure, only the plastic wheel 448 will be discussed in greater detail hereinafter. The plastic wheel 448 includes a cylindrical body 630 with an aperture extending therethrough configured to receive the metal shaft 424 therethrough. In one exemplary embodiment, the plastic wheels 448, 450 are constructed of UHMW plastic. Of course, in alternative embodiments, the plastic wheels 448, 450 could be constructed of other types of plastics known to those skilled in the art such as polypropylene, PVC, urethane, nylon, acetal, or polytetrafloraeythelyne for example.

The bolt 462 is disposed in the threaded aperture 600 of the metal shaft 422 to hold the wheels 440, 452 on the metal shaft 422. The bolt 464 is disposed in the threaded aperture 610 to hold the plastic wheel 448 on the metal shaft 424. A bolt is also disposed in the threaded aperture 602 to hold the plastic wheels 442, 446 on the metal shaft 424. Also, a bolt is disposed in the threaded aperture 611 of the metal shaft 424 to hold the plastic wheel 450 on the metal shaft 424.

Referring to FIG. 15, the carrier link 460 is configured to be coupled to the metal shaft 424. The carrier link 460 includes an aperture extending therethrough configured to receive the metal shaft 424 therethrough. Thus, the carrier link 460 can rotate about the metal shaft 424. The carrier link 460 is coupled to a vehicle conveyor system that pulls the carrier link 460 and the car wash roller 350. In one exemplary embodiment, the carrier link 460 is constructed of steel. Of course, in alternative embodiments, the carrier link 460 can be constructed of other types of materials known to those skilled in the art.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A car wash roller, comprising:
   an elongated plastic body having a first side surface, a second side surface disposed opposite the first side surface, a top surface, a bottom surface disposed opposite the top surface, and first and second apertures extending therethrough from the first side surface to the second side surface;
   a first metal shaft disposed in the first aperture such that a first portion of the first metal shaft extends outwardly from the first side surface and a second portion of the first metal shaft extends outwardly from the second side surface;
   the elongated plastic body further having a third aperture extending from the top surface to the first aperture, the first metal shaft having an aperture extending therein that is aligned with the third aperture;
   a locking member disposed in both the third aperture of the elongated plastic body and the aperture of the first metal shaft that prevents the first metal shaft from rotating relative to the elongated plastic body;
   first and second plastic sleeves that are disposed over the first and second portions, respectively, of the first metal shaft, such that the first and second plastic sleeves do not rotate relative to the first metal shaft;
   first and second plastic wheels that are rotatably coupled to the first and second plastic sleeves, respectively;
   a second metal shaft disposed in the second aperture such that a first portion of the second metal shaft extends outwardly from the first side surface and a second portion of the second metal shaft extends outwardly from the second side surface;
   third and fourth plastic wheels that are rotatably coupled to the first portion of the second metal shaft and the second portion of the second metal shaft, respectively; and
   a carrier link coupled to the elongated plastic body proximate to the third and fourth plastic wheels.

2. The car wash roller of claim 1, further comprising fifth and sixth plastic wheels that are rotatably coupled to the first and second plastic sleeves, respectively, adjacent the first and second plastic wheels, respectively.

3. The car wash roller of claim 2, wherein the first plastic wheel has an aperture extending therein configured to receive a sleeve of the fifth plastic wheel therein.

4. The car wash roller of claim 2, further comprising first and second metal sleeves coupled over portions of the fifth and sixth plastic wheels, respectively.

5. The car wash roller of claim 1, wherein the first plastic wheel is constructed of urethane plastic.

6. The car wash roller of claim 1, wherein the first and second apertures are disposed proximate to first and second ends, respectively, of the elongated plastic body, the elongated plastic body further having a groove extending from the second end into the plastic body.

7. The car wash roller of claim 6, wherein at least a portion of the carrier link is received in the groove.

8. The car wash roller of claim 1, wherein a weight of the car wash roller is less than 10 pounds.

9. The car wash roller of claim 1, wherein a distance between the first side surface and the second side surface is 1.0 -1.75 inches.

10. The car wash roller of claim 1, wherein a distance between the top surface and the bottom surface is 1-3 inches.

11. A method for manufacturing a car wash roller, comprising:
    cutting a plastic component to form an elongated plastic body having a first side surface, a second side surface disposed opposite the first side surface, a top surface, and a bottom surface disposed opposite the top surface, utilizing a milling machine;
    drilling first and second apertures through the elongated plastic body that extends from the first side surface to the second side surface utilizing a drill;
    disposing a first metal shaft through the first aperture such that a first portion of the first metal shaft extends outwardly from the first side surface and a second portion of the first metal shaft extends outwardly from the second side surface;
    drilling a third aperture through the elongated plastic body extending from the top surface to the bottom surface;
    drilling an aperture through the first metal shaft;
    disposing a locking member in both the third aperture of the elongated plastic body and the aperture of the first metal shaft that prevents the first metal shaft from rotating relative to the elongated plastic body;
    disposing first and second plastic sleeves over the first and second portions, respectively, of the first metal shaft, utilizing a placement machine such that the first and second plastic sleeves do not rotate relative to the first metal shaft;
    rotatably coupling first and second plastic wheels to the first and second plastic sleeves, respectively;
    disposing a second metal shaft through the second aperture such that a first portion of the second metal shaft extends outwardly from the first side surface and a second portion of the second metal shaft extends outwardly from the second side surface; and
    rotatably coupling third and fourth plastic wheels to the first portion of the second metal shaft and the second portion of the second metal shaft, respectively.

12. The method of claim 11, further comprising rotatably coupling fifth and sixth plastic wheels to the first and second plastic sleeves, respectively, adjacent to the first and second plastic wheels, respectively.

13. The method of claim 11, further comprising coupling a carrier link to the elongated plastic body proximate to the third and fourth plastic wheels.

* * * * *